United States Patent
Hood et al.

Patent Number: 5,262,368
Date of Patent: Nov. 16, 1993

[54] SINTERING AID

[75] Inventors: Christopher Hood, Reading; John F. Clifford, Sydenham; Timothy P. Beales; John Bultitude, both of Banbury, all of United Kingdom

[73] Assignee: TAM Ceramics, Inc., Niagara Falls, N.Y.

[21] Appl. No.: 794,245

[22] Filed: Nov. 19, 1991

[30] Foreign Application Priority Data

Nov. 28, 1990 [GB] United Kingdom ............... 794245

[51] Int. Cl.$^5$ .............. C04B 35/46; C04B 35/48; C04B 35/49
[52] U.S. Cl. ................. 501/136; 501/135; 501/137
[58] Field of Search ........... 264/66; 501/134, 135, 501/136, 137, 139

[56] References Cited

U.S. PATENT DOCUMENTS

| | | | |
|---|---|---|---|
| 2,768,901 | 10/1956 | Tombs | 501/137 |
| 4,266,265 | 5/1981 | Maher | 361/321 |
| 4,283,753 | 8/1981 | Burn | 361/321 |
| 4,530,031 | 7/1985 | Donohue | 361/321 |
| 5,011,804 | 4/1991 | Bergna et al. | 501/138 |

*Primary Examiner*—Karl Group
*Assistant Examiner*—Michael A. Marcheschi
*Attorney, Agent, or Firm*—Watson, Cole, Grindle & Watson

[57] ABSTRACT

A method of sintering a ceramic material composed of alkaline earth metal titanate and mixtures thereof, wherein the ceramic material is mixed with a sintering aid of a mixture of a mixed metal oxide of the formula $BaCuO_2$ and an oxide selected from the group consisting of tungsten trioxide, molybdenum trioxide and mixtures thereof, and sintering the mixture.

10 Claims, 3 Drawing Sheets

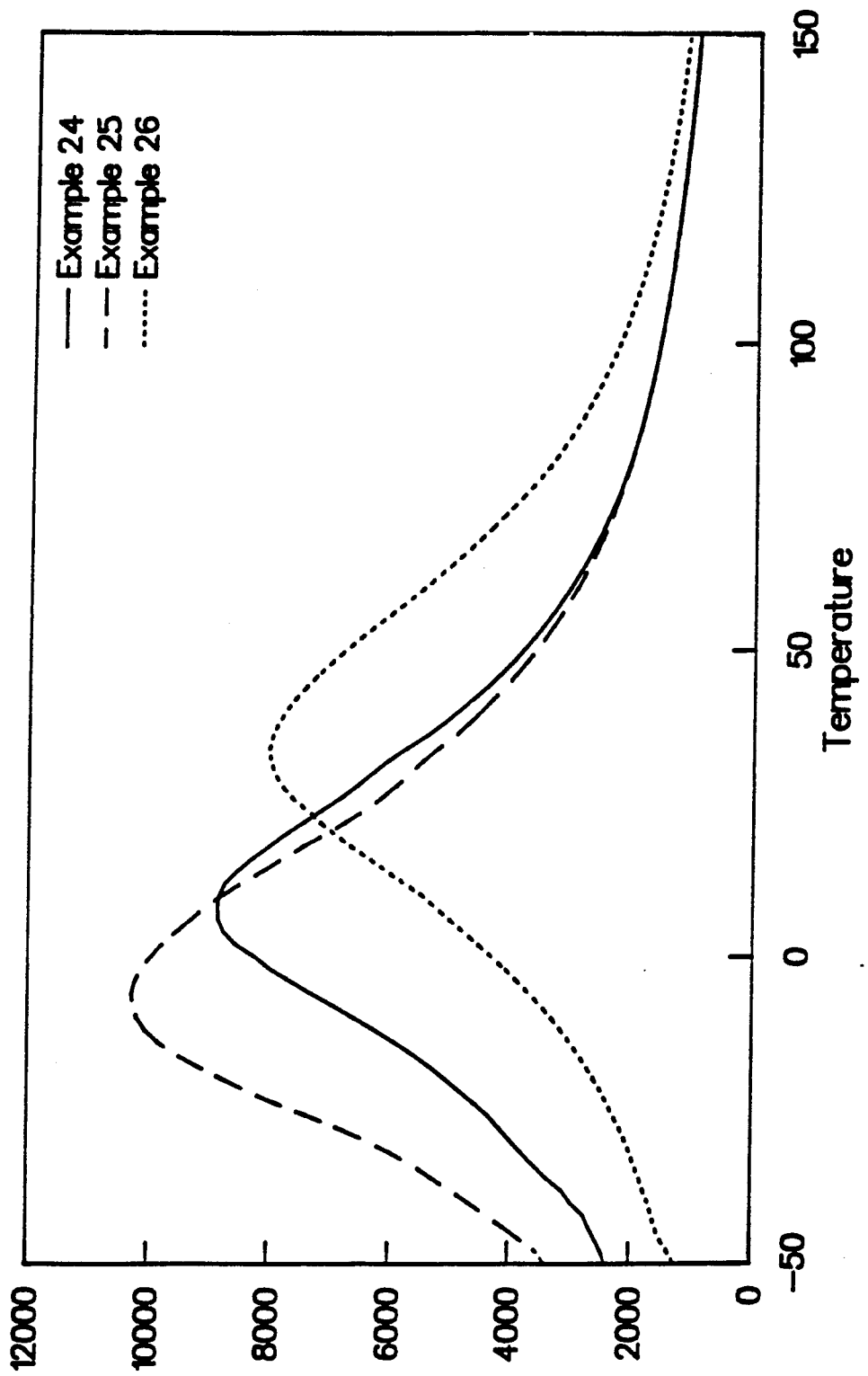

SINTERING AID

BACKGROUND OF THE INVENTION

1. Field of the Invention

The present invention relates to a sintering aid for alkaline earth metal titanates and in particular, to a sintering aid which avoids the use of toxic components, and which can be used with water-based binder systems based on polyvinyl alcohol.

2. The Prior Art

Barium titanate and its isostructural derivatives are ceramic materials which are widely used as dielectric materials for the manufacture of capacitors. Dense barium titanate cannot be formed by sintering at temperatures below approximately 1250° C. When such materials are used for the manufacture of multilayer ceramic capacitors, this high sintering temperature and the necessary presence of oxygen entails the use of electrodes made from expensive precious metals such as palladium. A reduction in the manufacturing cost of such capacitors can be made by the substitution of silver for some of the palladium used in the electrodes. An alloy containing a ratio of 70:30 parts of Ag:Pd is commonly used, but this requires the sintering temperature, to be lowered to below 1150° C. To achieve this reduction in processing temperature additions of materials referred to as "sinter aids" are made to the ceramic material.

Previously, barium titanate has been sintered at temperatures of 950° to 1150° C. using as sintering aids glasses containing one or more of the elements bismuth, lead, cadmium and boron. Although relatively dense products are obtained, the products suffer from the disadvantages that the fluxes used reduce the permittivity of the ceramic by dilution and/or by forming secondary phases which are detrimental to the electrical or mechanical properties of the sintered body. Furthermore, lead and cadmium are toxic, whilst boron causes gels to form with water-based binder systems containing poly(vinyl alcohol), which restricts its use to binders compatible with organic solvents.

It is also well known in the art that incorporating other aliovalent ions into the $BaTiO_3$ perovskite lattice forming solid solution and/or composite materials can both shift, broaden and flatten the Curie peaks—forming commercially useful dielectrics. Numerous examples can be found in the literature of blends containing one or more of, for example, calcium and strontium titanates or zirconates and calcium, magnesium or bismuth stannates. In addition to "peak shifters," commercial formulations typically contain other additives, e.g., $Nb_2O_5$, $MnO_2$, CaO and NiO, to modify grain growth characteristics, loss factor or insulation resistance and such like.

U.S. Pat. No. 4,222,885 discloses a method for producing a dielectric having a perovskite structure consisting essentially of one or more alkaline earth titanates, alkaline earth zirconates, alkaline earth stannates and mixed crystals thereof in which an admixture of eutectic-forming compounds, which cannot in practice be built into the perovskite lattice, are added to the perovskite and the mixture sintered at a partial oxygen pressure of 0.2 to 1 Bar at a temperature in the range of from 1000° to 1250° C. The eutectic forming compounds are compounds capable of forming $CuO.MeO_x$ when sintered in an oxygen atmosphere, $MeO_x$ being the oxide of at least one element of group III, V, VI or VII of the Periodic Table of the Elements U.S. Pat. No. 4,244,830 discloses a method of forming a dielectric having a perovskite structure which is similar to that disclosed in U.S. Pat. No. 4,222,885. The method comprises adding to the perovskite eutectic-forming compounds which are capable of forming $CuO.Cu_2O$ or $CuO.Cu_2O.Me^{IV}O_2$ when sintered in an oxygen atmosphere, where $Me^{IV}O_2$ is at least one oxide of an element of group IV of the Periodic Table of the Elements. Sintering is carried out at a partial oxygen pressure in the range of from 0.2 to 1 Bar at a temperature in the range of from 1000° to 1250° C.

U.S. Pat. No. 4,283,753 discloses a dielectric ceramic material comprising a major portion of barium titanate, the positive ions consisting of:

a number $N_D$ of large divalent ions selected from Ba, Pb, Ca and combinations thereof, a number $N_Q$ of small quadravalent ions selected from Ti, Zr, Sn, Mn and combinations thereof, a number $N_X$ of donor ions capable of having a valence of greater than +4 as a small cation selected from Bi, Nb, Sb, W, Mo and combinations thereof, and a number $N_{CC}$ of charge compensating acceptor ions capable of having a valance of +1 as a large cation selected from Cd, Zn, Cu, Li, Na and combinations thereof, and a number of $N_G$ of glass-forming ions selected from B, Si, Ge, P, V and combinations thereof wherein the various numbers $N_D$, $N_Q$, $N_X$, $N_{CC}$ and $N_Q$ are related by certain equations outlined in U.S. Pat. No. 4,283,753.

SUMMARY OF THE INVENTION

We have now developed a novel low temperature sintering aid for alkaline earth metal titanates which forms a liquidus phase during sintering and which thereby acts to transport material within the ceramic body.

Accordingly, the present invention provides a method of sintering an alkaline earth metal titanate, or a mixture thereof, which comprises the use as a sintering aid of a mixture of a mixed metal oxide of the formula $BaCuO_2$ and at least one of tungsten trioxide or molybdenum trioxide.

It is believed that the action of the sintering aid used in the present invention is different from that of the vitreous phases previously used in low firing formulations. A low viscosity liquid is formed which promotes high diffusion rates. Relatively large, homogeneous crystallites of the alkaline earth metal titanate are formed during sintering and these structures result in large, sharp peaks in the temperature—permittivity curves which can thus be exploited in the development of high permittivity dielectric formulations.

The sintering aid used in the present invention is a mixture of $BaCuO_2$ with tungsten trioxide, $WO_3$, and/or molybdenum trioxide, $MoO_3$.

The sintering aid is preferably used in the present invention in an amount of from 1.0 to 10 mole percent, more preferably in an amount of from 1 to 5 mole percent by weight, and still more preferably in an amount of from 2 to 4 mole percent.

The mole ratio of the $BaCuO_2$ to $WO_3$ and/or $MoO_3$ used in the sintering aid is preferably in the range of from 1 1 to 3:1 of $BaCuO_2$ to $WO_3$ and/or $MoO_3$, more preferably from 2:1 to 5:2 of $BaCuO_2$ to $WO_3$ and/or $MoO_3$.

Alkaline earth metal titanates which can be sintered advantageously using the sintering aid in accordance with the invention are barium titanate, strontium titanate or mixtures thereof. It will be understood by those skilled in the art that the alkaline earth metal titanates which are sintered in accordance with the invention may include one or more ions which shift the temperature at which the maximum permittivity occurs. These ions are generally termed peak modifying ions or peak shifters and are well known to those skilled in the art. Examples of peak modifying ions are the zirconates or stannates. In addition to one or more peak modifying ions, other additives may be included to modify grain growth characteristics, loss factor or insulation resistance.

In one embodiment of the present invention an intimate mixture of the sintering aid and the alkaline earth metal titanate is prepared by milling with a milling medium. The milling medium may be, for example, water, an organic medium such as 1,1,1-trichloroethane or iso-propanol, or a mixture thereof. An inert grinding medium, such as zirconia, may be used if desired. The milling step produces an intimately mixed slurry which is preferably dried prior to calcination. The dried mixture may optionally be sieved to separate large particles therefrom prior to calcination. The mixture is then formed into a ceramic body, for example by pressing. The ceramic body is then sintered, preferably at a temperature of below 1150° C., more preferably at a temperature of below 1100° C.

The method of the present invention enables dense sintered alkaline earth metal titanates to be obtained.

The invention also includes within its scope sintered alkaline earth metal titanates produced by the aforesaid method and dielectric materials which comprise such a sintered alkaline earth metal titanate.

As previously mentioned the alkaline earth metal titanates sintered according to the method of the present invention have a relatively high permittivity and are thus useful as dielectric materials. Capacitive devices, such as multilayer capacitors, may thus be prepared in which the sintered material in accordance with the invention constitutes the dielectric material or dielectric layers.

The present invention will be further described with reference to the following non-limiting Examples.

BRIEF DESCRIPTION OF THE DRAWINGS

FIGS. 1 to 3 illustrate, respectively, the relative permittivity of the sintered composition of Example 24, the dissipation factor of the composition of Example 24 and the relative permittivities of the compositions of Examples 24, 25 and 26.

EXAMPLE 1 (COMPARATIVE)

Figure 1:
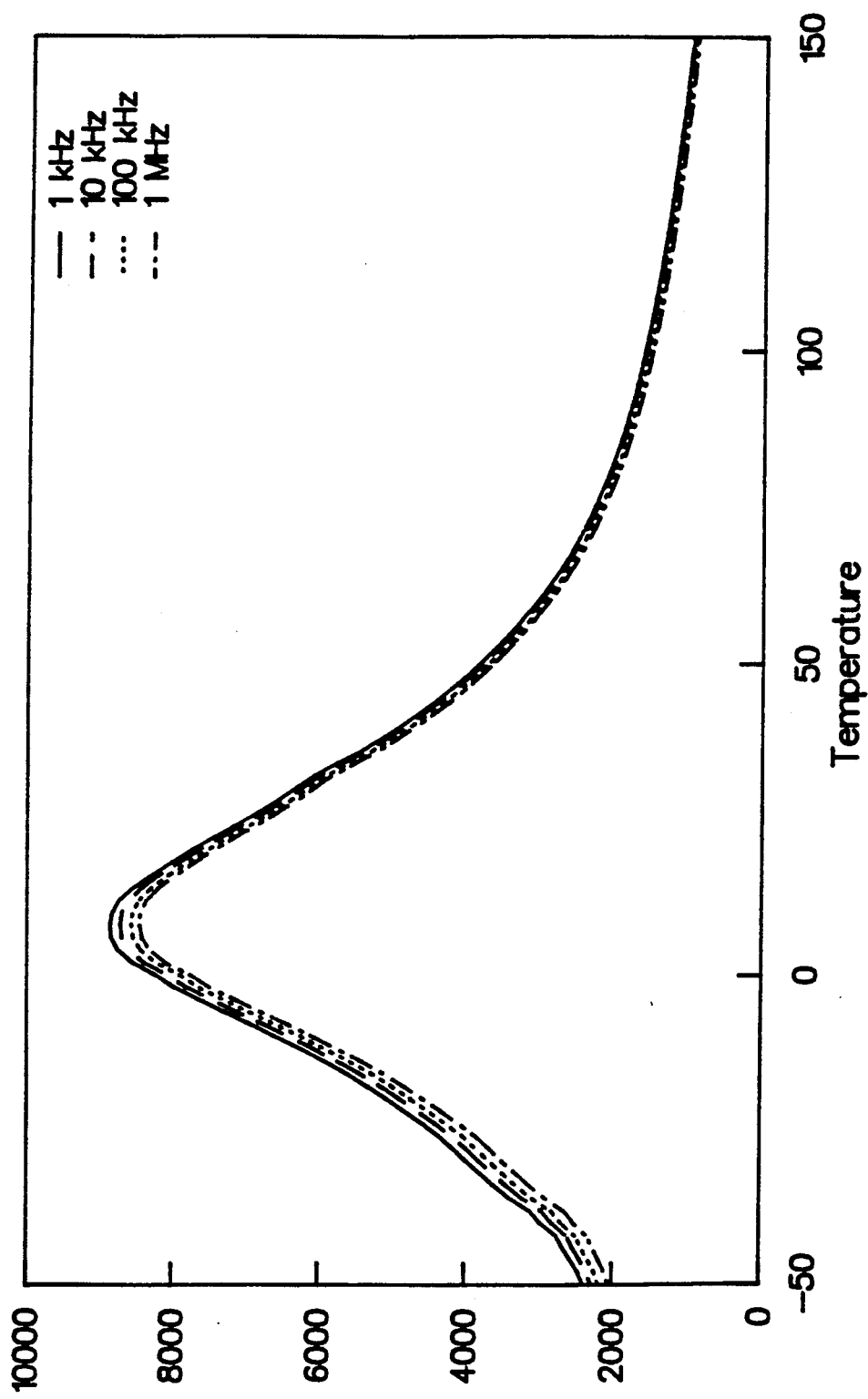

A mixed barium copper oxide, $BaCuO_2$, was prepared by mixing together equimolar proportions of barium peroxide, $BaO_2$, and copper oxide, CuO, and calcining the mixture at 850° C. The mixed barium copper oxide, $BaCuO_2$, was formed as confirmed by X-ray diffraction studies.

6 g of barium copper oxide and 194 g of barium titanate (HPB grade from TAM Ceramics Inc.) were milled together for 18 hours with sufficient 1,1,1-trichloroethane to form an appropriate slurry. No decomposition occurred The milled mixture was dried at 100° C. and sieved to remove the fraction above 150 micrometers particle size.

10 g of the sieved mixture was uniaxially pressed at 3700 $lb/in^2$ in a 19 mm die. The pellet was placed in a furnace and sintered by raising the temperature of the furnace from ambient to 1000° C. using a ramp rate of 5° C./min, holding the temperature at 1000° C. for 2 hours and then allowing the furnace to cool to room temperature at a rate of 5° C./min.

The density of the pressed and sintered pellet was 5.78 $g/cm^3$.

The sintered pellet was sectioned to give three discs of approximately 1 mm thickness. The diameters (d) and thicknesses (t) of the discs were accurately measured with a micrometer and recorded. The discs were degreased with acetone and electrodes were evaporated onto the faces of the discs. The capacitances and $tan\delta$ of loss for each disc were measured at ambient temperature using a Hewlett Packard 4194A Impedence/Gain Phase Analyzer at frequencies of 1, 10, 100 and 1000 kHz. The relative permittivity, $\epsilon_r$, of each disc was then calculated using the relationship given below (Equation 1)

$$\epsilon_r = (C \times t)(\epsilon_o \times A) \qquad \text{Equation 1}$$

where

C = the capacitance measured $\epsilon_o$ = the permittivity of free space = $8.85 \times 10^{-12}$ $Fm^{-1}$ A = the area of the disc face = $\pi \times (d \div 2)^2$ The range of permittivities and loss factors, $tan\delta$ (%) are given in Table 1.

TABLE 1

| Dielectric permittivities and loss factors for $BaTiO_3$ sintered with $BaCuO_2$ | | | | |
|---|---|---|---|---|
| Frequency kHz | Permittivity, $\epsilon_r$ | | Loss Factor, $Tan\delta$ % | |
| | maximum | minimum | maximum | minimum |
| 1 | 2146 | 2046 | 20.6 | 10.1 |
| 10 | 1946 | 1880 | 9.7 | 8.3 |
| 100 | 1663 | 1587 | 17.0 | 10.5 |
| 1000 | 1442 | 1045 | 64.4 | 20.2 |

EXAMPLE 2

3 g of barium copper oxide, $BaCuO_2$, 0.996 g of tungsten trioxide, $WO_3$, and 97 g of barium titanate (HPB grade from TAM Ceramics Inc.) were milled together for 24 hours with sufficient isopropyl alcohol to form an appropriate slurry. No decomposition occurred The milled mixture was dried, sieved and a 10 g pellet was pressed as for Example 1. The pellet was placed in a furnace and sintered by raising the temperature from ambient to 1100° C. using a ramp rate of 5°/min, holding the temperature at 1100° C. for 2 hours and then allowing the furnace to cool to room temperature at a rate of 5° C./min.

The pressed and sintered pellet had a density of 5.70 $g/cm^3$. The pellet was sectioned into discs and the permittivities and loss factors of the discs measured as described in Example 1. The range of permittivities and loss factors are given in Table 2.

TABLE 2

| Dielectric permittivities and loss factors for $BaTiO_3$ sintered with $BaCuO_2$ and $WO_3$. | | | | |
|---|---|---|---|---|
| Frequency kHz | Permittivity, $\epsilon_r$ | | Loss Factor, $Tan\delta$ % | |
| | maximum | minimum | maximum | minimum |
| 1 | 2001 | 1964 | 2.5 | 2.2 |

TABLE 2-continued

Dielectric permittivities and loss factors for
$BaTiO_3$ sintered with $BaCuO_2$ and $WO_3$.

| Frequency kHz | Permittivity, $\epsilon_r$ maximum | Permittivity, $\epsilon_r$ minimum | Loss Factor, Tan$\delta$ % maximum | Loss Factor, Tan$\delta$ % minimum |
|---|---|---|---|---|
| 10 | 1940 | 1910 | 2.0 | 1.8 |
| 100 | 1896 | 1871 | 2.9 | 1.9 |
| 1000 | 1860 | 1845 | 15.9 | 7.0 |

EXAMPLE 3

3 g of barium copper oxide, $BaCuO_2$, 0.618 g of molybdenum trioxide, $MoO_3$ and 97 g of barium titanate (HPB grade from TAM Ceramics Inc.) were milled together for 24 hours with sufficient isopropyl alcohol to form an appropriate slurry. No decomposition occurred. The milled mixture was dried, sieved and a 10 g pellet was pressed as for Example 1. The pellet was placed in a furnace and sintered by raising the temperature from ambient to 1100°C. using a ramp rate of 5°/min, holding the temperature at 1100° C. for 2 hours and then allowing the furnace to cool to room temperature at a rate of 5° C./min.

The pressed and sintered pellet had a density of 5.73 g/cm$^3$. The pellet was sectioned into discs and the permittivities and loss factors of the discs measured as described in Example 1. The range of permittivities and loss factors are given in Table 3.

TABLE 3

Dielectric permittivities and loss factors for
$BaTiO_3$ sintered with $BaCuO_2$ and $MoO_3$.

| Frequency kHz | Permittivity, $\epsilon_r$ maximum | Permittivity, $\epsilon_r$ minimum | Loss Factor, Tan$\delta$ % maximum | Loss Factor, Tan$\delta$ % minimum |
|---|---|---|---|---|
| 1 | 2482 | 2395 | 2.5 | 2.0 |
| 10 | 2399 | 2305 | 2.7 | 2.3 |
| 100 | 2315 | 2222 | 3.6 | 3.0 |
| 1000 | 2196 | 2112 | 12.4 | 7.2 |

It can be seen from a comparison of the results in Tables 1, 2 and 3 that the loss factors, tan$\delta$ (%), for the pellets which were sintered with the addition of tungsten trioxide or molybdenum trioxide to the barium copper oxide were much less than the loss factor for the pellet sintered with barium copper oxide alone.

The permittivities of the pellets which were sintered with the addition of tungsten trioxide or molybdenum trioxide to the barium copper oxide were also less variable over the frequency range of 1 to 1000 kHz than the permittivities for the pellet sintered with barium copper oxide alone.

EXAMPLES 4 TO 11

Following the procedure of Example 2, various compositions were prepared comprising pure barium titanate with additions of barium copper oxide and tungsten oxide in the amounts and ratios given below:

| Example Number | Total Addition (Mole %) | Mole Ratio $BaCuO_2/WO_3$ |
|---|---|---|
| 4 | 1.0 | 2.5 |
| 5 | 1.5 | 2.5 |
| 6 | 2.0 | 2.5 |
| 7 | 2.0 | 1.0 |
| 8 | 3.5 | 2.5 |
| 9 | 3.5 | 1.0 |
| 10 | 5.0 | 1.0 |
| 11 | 10.0 | 1.0 |

Each mixture was dried and sieved to remove the fraction above 100 mesh. Pellets were prepared from these compositions and pressed and sintered as described in Example 2. The densities of the pressed and sintered pellets are given in Table 4 below. The pellets were sectioned into discs approximately 1.5 mm thick and permittivities and loss factors of the discs were measured as described in Example 1 across the temperature range −50° to 150° C.

TABLE 4

| Example Number | Density | Maximum Permittivity at 1 kHz | Temperature of Maximum Permittivity | Loss Factor (%) at 25° C. and 1 kHz |
|---|---|---|---|---|
| 4 | 4.37 | 2160 | 140 | 0.7 |
| 5 | 5.05 | 3400 | 120 | 1.2 |
| 6 | 5.48 | 5670 | 110 | 1.6 |
| 7 | 5.54 | 4250 | 95 | 5.5 |
| 8 | 5.71 | 5730 | 92 | 2.8 |
| 9 | 5.54 | 6010 | 92 | 1.9 |
| 10 | 5.66 | 5660 | 92 | 4.2 |
| 11 | 5.74 | 4110 | 110 | 1.8 |

EXAMPLES 12 TO 19

Following the procedure of Example 3, various compositions were prepared comprising pure barium titanate with additions of barium copper oxide and molybdenum oxide in the amounts and ratios given below:

| Example Number | Total Addition (Mole %) | Mole Ratio $BaCuO_2/MO_3$ |
|---|---|---|
| 12 | 1.0 | 2.5 |
| 13 | 1.5 | 2.5 |
| 14 | 2.0 | 2.5 |
| 15 | 2.0 | 1.0 |
| 16 | 3.5 | 2.5 |
| 17 | 3.5 | 1.0 |
| 18 | 5.0 | 1.0 |
| 19 | 10.0 | 1.0 |

Each mixture was dried and sieved to remove the fraction above 100 mesh. Pellets were prepared from these compositions and pressed and sintered as described in Example 3. The densities of the pressed and sintered pellets are given in Table 5 below. The pellets were sectioned into discs approximately 1.5 mm thick and the permittivities and loss factors of the discs were measured as described in Example 1 across the temperature range −50° C. to 150° C.

TABLE 5

| Example Number | Density | Maximum Permittivity at 1 kHz | Temperature of Maximum Permittivity | Loss Factor (%) at 25° C. and 1 kHz |
|---|---|---|---|---|
| 12 | 4.50 | 2160 | 145 | 1.4 |
| 13 | 4.69 | 2470 | 145 | 2.3 |
| 14 | 5.14 | 3270 | 145 | 4.2 |
| 15 | 4.68 | 2380 | 128 | 2.4 |
| 16 | 5.72 | 4750 | 130 | 1.3 |
| 17 | 4.68 | 2430 | 128 | 8.2 |
| 18 | 4.77 | 2410 | 128 | 8.2 |
| 19 | 5.53 | 3040 | 145 | 1.8 |

EXAMPLE 20 TO 23

Following the procedure of Example 3, various compositions were prepared comprising pure barium titanate with additions of barium copper oxide and a mixture of molybdenum and tungsten oxides in equimolar proportions.

| Example Number | Total Addition (Mole %) | Mole Ratio $BaCuO_2/WO_3$ |
|---|---|---|
| 20 | 2.0 | 1.0 |
| 21 | 3.5 | 2.5 |
| 22 | 3.5 | 1.0 |
| 23 | 5.0 | 1.0 |

Each mixture was dried and sieved to remove the fraction above 100 mesh. Pellets were prepared from these compositions and pressed and sintered as described in Example 3. The densities of the pressed and sintered pellets are given in Table 6 below. The pellets were sectioned into discs approximately 1.5 mm thick and the permittivities and loss factors of the discs were measured as described in Example 1 across the temperature range −50° C. to 150° C.

TABLE 6

| Example Number | Density | Maximum Permittivity at 1 kHz | Temperature of Maximum Permittivity | Loss Factor (%) at 25° C. and 1 kHz |
|---|---|---|---|---|
| 20 | 4.92 | 2840 | 130 | 1.1 |
| 21 | 5.69 | 5750 | 130 | 2.0 |
| 22 | 4.94 | 2790 | 140 | 1.7 |
| 23 | 5.04 | 2930 | 140 | 1.1 |

EXAMPLES 24 TO 26

Following the procedure of Example 3, various compositions were prepared comprising barium titanate (HPB and/or COF70 grades from Tam Ceramics, Inc.), strontium titanate and certain peak modifying ions. The formulations are given below, the amounts as stated being in mole percent:

| Ex. No. | $BaTiO_3$ (HPB) | $BaTiO_3$ (COF70) | $SrTiO_3$ | $BaZrO_3$ | $MnSO_4$ | $BaCuO_2$ | $WO_3$ |
|---|---|---|---|---|---|---|---|
| 24 | — | 80.6 | 9.0 | 5.6 | 0.8 | 2.5 | 1.5 |
| 25 | — | 80.6 | 5.6 | 9.0 | 0.8 | 2.5 | 1.5 |
| 26 | 42.4 | 42.4 | 2.0 | 9.0 | 0.2 | 2.5 | 1.5 |

Pellets were prepared from these compositions and pressed and sintered as described in Example 3. The densities of the pressed and sintered pellets are given in Table 7 below. The pellets were sectioned into discs approximately 1.5 mm thick and the permittivities and loss factors of the discs were measured as described in Example 1 across the temperature range −50° to 150° C.

TABLE 7

| Example Number | Density | Maximum Permittivity at 1 kHz | Temperature of Maximum Permittivity | Loss Factor (%) at 25° C. and 1 kHz |
|---|---|---|---|---|
| 24 | 5.67 | 8860 | 8 | 0.9 |
| 25 | 5.75 | 10200 | −6 | 1.6 |
| 26 | 5.65 | 8020 | 34 | 1.2 |

The influence of the peak modifying ions on the temperature of maximum permittivity is clearly shown by a comparison of Examples 24, 25 and 26.

Figure 2:
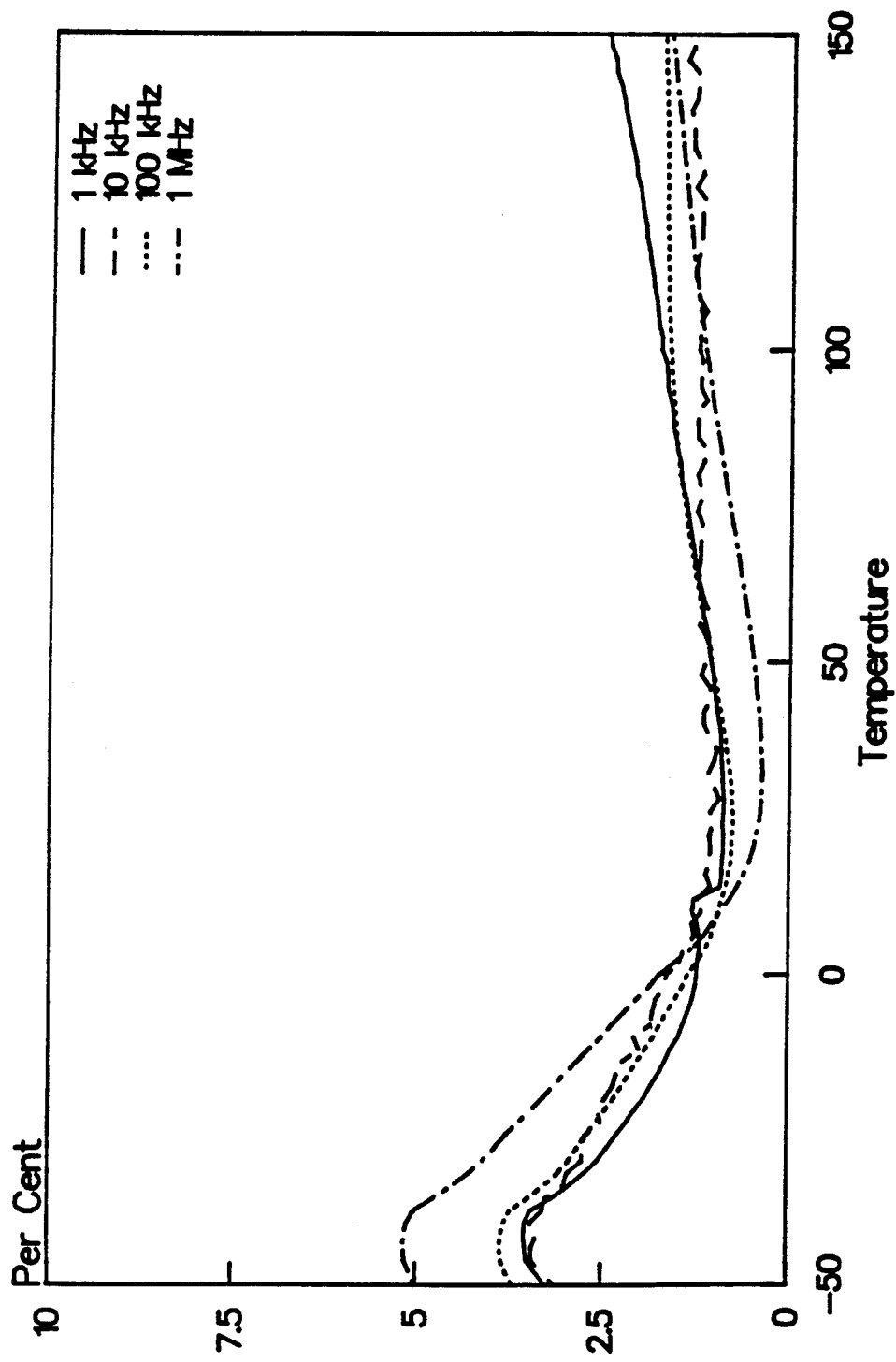

Referring to the accompanying drawings, FIG. 1 illustrates the relative permittivity of the composition of Example 24 over the frequency range of 1 kHz to 1 MHz, FIG. 2, illustrates the dissipation factor of the composition of Example 24 over the frequency range of 1 kHz to 1 MHz and FIG. 3 illustrates the relative permittivity at 1 kHz for the compositions of Examples 24, 25 and 26.

We claim:

1. A method of preparing a sintered ceramic alkaline earth metal titanate having a low loss factor and a permittivity of reduced variation over a frequency range of 1 to 1000 kHz, said method comprising the steps of (a) preparing an intimate mixture of at least one alkaline earth metal titanate and a sintering aid consisting of a mixture of $BaCuO_2$ and an oxide selected from the group consisting of $WoO_3$, $MoO_3$ and mixtures thereof, and (b) sintering said intimate mixture of a temperature below 1,150° C.

2. Method according to claim 1 wherein the sintering aid is used in an amount of from 1.0 to 10 mole percent.

3. Method according to claim 1 wherein the sintering and is used in an amount of from 2 to 4 mole percent.

4. Method according to claim 1 wherein the mole ratio of $BaCuO_2$ to the oxide is in the range of from 1:1 to 3:1.

5. Method according to claim 1 wherein the mole ratio of $BaCuO_2$ to the oxide is in the range of from 2:1 to 5:2.

6. Method according to claim 1 wherein the alkaline earth metal titanate is selected from the group consisting of barium titanate, strontium titanate and mixtures thereof.

7. Method according to claim 1, wherein the alkaline earth metal titanate contains a peak modifying ion selected from the group consisting of a stannate and a zirconate.

8. A method as claimed in claim 1, wherein said low loss factor is less than or equal to 15.9% over the frequency range of 1 to 1000 kHz.

9. A method as claimed in claim 1, wherein said low loss factor is no more than 5% over a temperature range of −50° C. to 150° C.

10. A method as claimed in claim 1, wherein said low loss factor is less than or equal to 2.5% at 1 kHz and 25° C.

* * * * *